United States Patent
Chao et al.

(10) Patent No.: US 7,355,371 B2
(45) Date of Patent: Apr. 8, 2008

(54) VOLTAGE REGULATOR AND METHOD THEREOF

(75) Inventors: Chun-An Chao, Kaohsiung (TW); Chia-Hsien Chang, Taipei Hsien (TW)

(73) Assignee: Ali Corporation, Taipei (TW)

(*) Notice: Subject to any disclaimer, the term of this patent is extended or adjusted under 35 U.S.C. 154(b) by 0 days.

(21) Appl. No.: 11/421,164

(22) Filed: May 31, 2006

(65) Prior Publication Data
US 2007/0279026 A1 Dec. 6, 2007

(51) Int. Cl.
*G05F 1/577* (2006.01)
*G05F 1/575* (2006.01)

(52) U.S. Cl. ........................ 323/267; 323/283

(58) Field of Classification Search ............... 323/225, 323/267, 268, 271, 282, 283, 285

See application file for complete search history.

(56) References Cited

U.S. PATENT DOCUMENTS

| | | | |
|---|---|---|---|
| 4,725,940 A * | 2/1988 | Henze | ........................ 363/72 |
| 5,617,015 A | 4/1997 | Goder et al. | |
| 5,886,513 A | 3/1999 | Appeltans et al. | |
| 5,939,871 A | 8/1999 | Tanaka | |
| 6,204,651 B1 * | 3/2001 | Marcus et al. | ............... 323/283 |
| 6,329,800 B1 * | 12/2001 | May | ............................ 323/283 |
| 6,791,305 B2 | 9/2004 | Imai et al. | |
| 6,946,820 B2 * | 9/2005 | Ishii et al. | ................... 323/222 |
| 6,977,447 B2 | 12/2005 | May | |

* cited by examiner

*Primary Examiner*—Gary L. Laxton
(74) *Attorney, Agent, or Firm*—Thomas, Kayden, Horstemeyer & Risley

(57) ABSTRACT

A voltage regulator. A first analog to digital converter generates first data according to a first output voltage. A second analog to digital converter generates second data according to a second output voltage. A voltage adjustment device generates a voltage control signal according to the first data and the second data. A switching module respectively provides the first output voltage and the second output voltage to a first load and a second load according to the voltage control signal.

20 Claims, 3 Drawing Sheets

| Voltage | 2's complement | 2's complement value |
|---|---|---|
| 0.935~0.94 | 11000 | -8 |
| 0.93~0.935 | 11001 | -7 |
| 0.925~0.93 | 11010 | -6 |
| 0.92~0.925 | 11011 | -5 |
| 0.915~0.92 | 11100 | -4 |
| 0.91~0.915 | 11101 | -3 |
| 0.905~0.91 | 11110 | -2 |
| 0.9~0.905 | 11111 | -1 |
| 0.895~0.9 | 00001 | 1 |
| 0.89~0.895 | 00010 | 2 |
| 0.89~0.885 | 00011 | 3 |
| 0.885~0.88 | 00100 | 4 |
| 0.88~0.875 | 00101 | 5 |
| 0.875~0.87 | 00110 | 6 |
| 0.87~0.865 | 00111 | 7 |
| 0.865~0.86 | 01000 | 8 |

FIG. 3

VOLTAGE REGULATOR AND METHOD THEREOF

BACKGROUND OF THE INVENTION

1. Field of the Invention

The invention relates to power supplies, and in particular relates to voltage regulators regulating direct current (DC) output voltages using analog-to-digital converters.

2. Description of the Related Art

Switched mode power supplies or adapters are widely used to power electronic devices as well as charge batteries for mobile devices such as wireless phones, palm top computers, toys, etc. The output voltage of the power supply must be regulated within a specified range depending on the devices being powered. Typically this requires that the switched mode power supply includes components at the output of the power supply that sense the output voltage and provide feedback for a switched mode power supply controller or regulator which adjusts the power supply operation accordingly to maintain output regulation.

FIG. 1 is a schematic block diagram of a conventional DC to DC converter having multiple DC outputs, as disclosed in U.S. Pat. No. 6,204,651 to Marcus et al. The DC to DC converter includes a differential comparator 10, a combining module 12, a comparator 14, a decimator 16, an interpolator 18, an expanded switching module 20, an external element 21, a source 22, a first load 24, a second load 26, and a differencing module 28.

Load 24 produces a first output voltage and load 26 produces a second output voltage. The combining module 12 receives the first and second output voltages, or representations thereof, and produces a combined output voltage by combining first and second output voltages in a fixed ratio. The representative combined voltage is received by comparator 14. Comparator 14 produces the digital stream of comparison data according to the representative combined voltage and a reference voltage Vref.

The decimator 16 receives the digital stream of comparison data and produces a digital stream of charged data and load data to interpolator 18. Here, combining module 12, comparator 14, and decimator 16 comprise a first electrical path for interpolator 18 to determine charge or load operation.

The differencing module 28 receives the first and second voltages to produce a representation of the first and second voltages. The differential comparator 10 compares the representation of the first and second output voltages, and provides a feedback signal to interpolator 18 through a second electrical path indicating whether the first output voltage or the second output voltage is to be load destination for the external element 21. For example, if the first output voltage is lower than the second output voltage, then the load signal 182 corresponding to load 24 will be active during the given set of clock cycles, and if the first output voltage exceeds the second output voltage, then the load signal 181 corresponding to load 26 will be active during the given set of clock cycles.

The interpolator 18 receives the digital stream of charged data, load data through the first electrical path, and the output of the differential comparator 10 through the second electrical path, and produces load signals 181 and 182 and charge signal 183.

When the charge signal 183 is enabled, the N-channel transistor 201 in switching module 20 is enabled while the P-channel transistors 203 and 205 are disabled. In this configuration, the external device 21 is charged by the source 22. When the load signal 181 is enabled and the charge signal 183 is disabled, the P-channel transistor 203 of switching module 20 is turned on, while the N-channel transistor 201 is turned off. In this configuration, the external element 21 is coupled to the load 26 and the source 22 such that it discharges energy into the load 26, increasing the second output voltage. When the load signal 182 is enabled and the charge signal 183 is disabled, the P-channel transistor 205 of switching module 20 is turned on, and the N-channel transistor 201 is turned off. In this configuration, the external element 21 is coupled to the load 24 and the source 22 such that it discharges energy into the load 24, increasing the first output voltage.

The interpolator 18, based on the feedback comparator 10 and the digital stream of charge data and load data, enables the charge signal 183 and load signal 181 or load signal 182. Accordingly, when the differential comparator 10 provides feedback to interpolator 18 that the first output voltage is to be regulated, the interpolator 18 enables the load signal 182. Similarly, when the differential comparator 10 provides feedback to interpolator 18 that the second output voltage is to be regulated, the interpolator 18 enables load signal 181. Thus, for any given set of clock cycles, interpolator 18 will enable the charge signal 183 and either load signal 181 or load signal 182.

However, an additional differential comparator 10 and combining module 12 are required to determine which load should be regulated, consuming power and increasing cost. In addition, interpolator 18 enables the charge signal 183 and load signal 181 or load signal 182 according to the data received from the first and second electrical paths, which may destabilize the generated voltage unstable.

BRIEF SUMMARY OF INVENTION

Voltage regulators are provided. An exemplary embodiment of such a voltage regulator, comprises a first analog to digital converter generating first data according to a first output voltage, a second analog to digital converter generating second data according to a second output voltage, a voltage adjustment device generating a voltage control signal according to the first data and the second data, and a switching module respectively providing the first output voltage and the second output voltage to a first load and a second load according to the voltage control signal.

An exemplary embodiment of a voltage regulating method comprises generating first data according to a first output voltage by analog to digital conversion, generating second data according to a second output voltage by analog to digital conversion, generating a voltage control signal according to the first data and the second data, and respectively providing the first output voltage and the second output voltage to a first load and a second load according to the voltage control signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 3 is a table showing the relationship between the output voltage and its corresponding digital stream presented in two's complement form, and the corresponding two's complement value.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
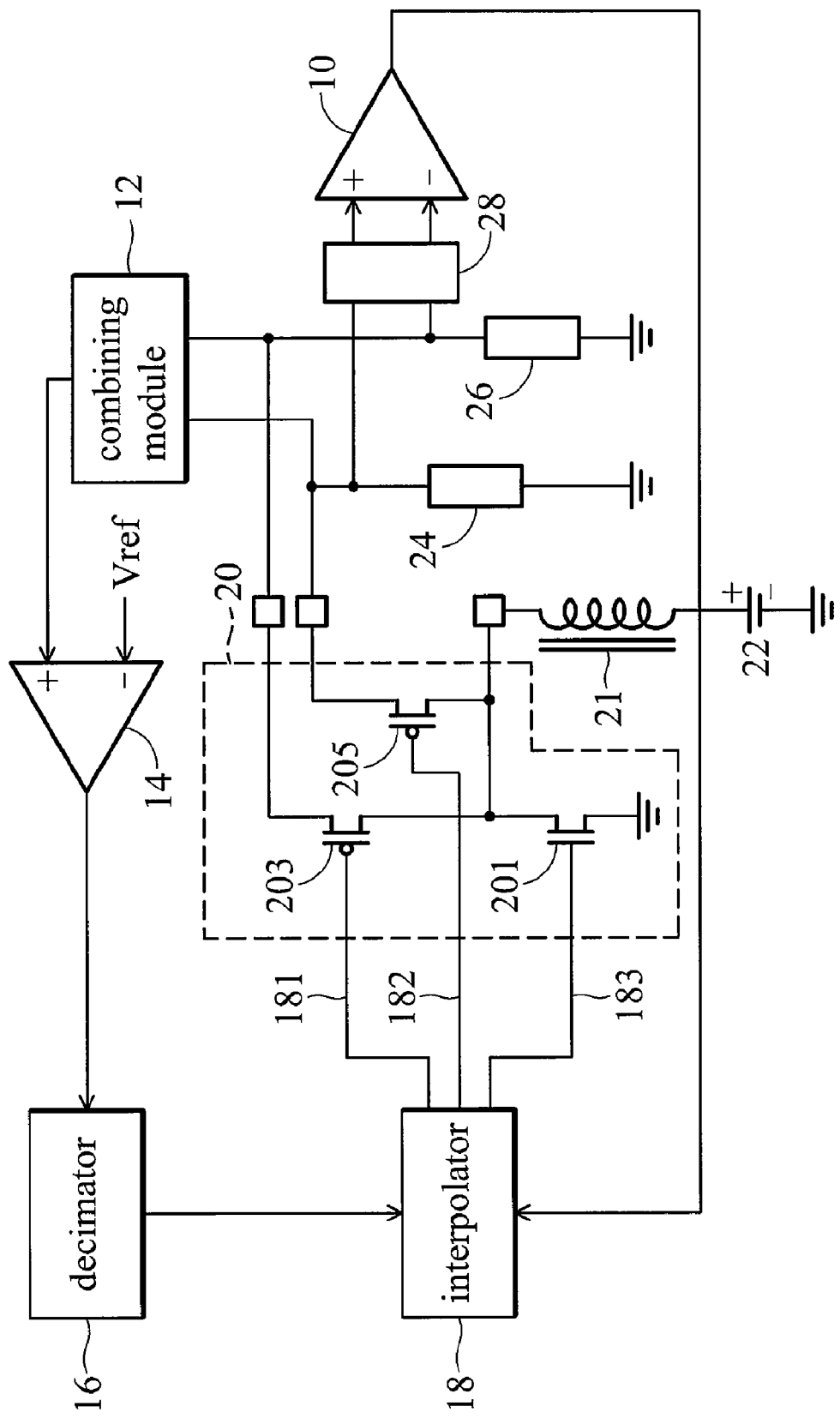
FIG. 1 is a schematic block diagram of a conventional DC to DC converter.
Figure 2:
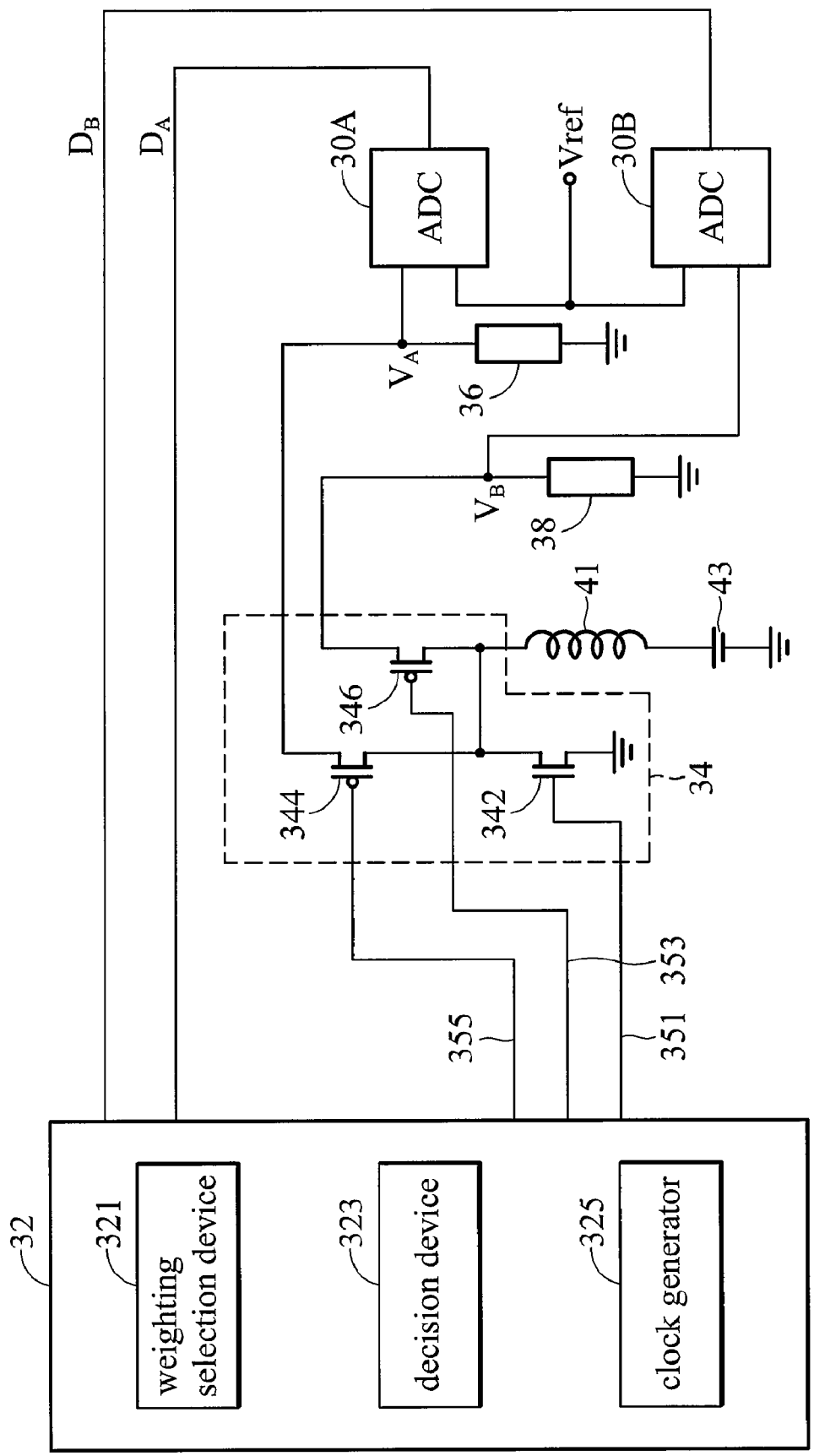
FIG. 2 is a block diagram of an embodiment of a voltage regulator according to an embodiment of the invention.

FIG. 2 is a block diagram of an embodiment of a voltage regulator according to an embodiment of the invention. The voltage regulator according to an embodiment of the invention comprises analog to digital converters 30A and 30B, a voltage adjustment device 32 and a switching module 34.

Analog to digital converter 30A generates a first digital stream according to the first output voltage $V_A$ at load 36 and reference voltage Vref, and generates first data $D_A$ according to the first digital stream. Analog to digital converter 30B generates a second digital stream according to the second output voltage $V_B$ at load 38 and reference voltage Vref, and generates second data $D_B$ according to the second digital stream. According to an embodiment of the invention, the first digital stream and the second digital stream can be presented in two's complement form, and first data $D_A$ and second data $D_B$ are integral two's complement values.

Two's complement is a method of signifying negative integers in computer science. It is also an operation of negation (converting positive to negative numbers or vice versa) in computers which represent negative numbers using two's complement. Its use is ubiquitous today because it doesn't require the addition and subtraction circuitry to examine the signs of the operands to determine whether to add or subtract, making it both simpler to implement and capable of easily handling higher precision arithmetic. As well, 0 has only a single representation, obviating the subtleties associated with negative zero.

In an n-bit binary number, the most significant bit is usually the $2^{n-1}$ s place. But in the two's complement representation, its place value is negated, and it becomes the $-2^{n-1}$ s place and is called the sign bit. If the sign bit is zero, the value is non-negative, the same as an ordinary binary number. But if the sign bit is 1, the value is negative. Negation of a two's complement number requires inversion of all the bits and addition of 1 to the result. If all bits are 1, the value is −1. If the sign bit is 1 but the rest of the bits are 0, the value is the most negative number, $-2^{n-1}$ for an n-bit number. The absolute value of the most negative number cannot be represented by the same number of bits.

A two's complement 5-bit binary numeral can represent every integer in the range −16 to +16. If the sign bit is 0, then the largest value that can be stored in the remaining four bits is $2^4-1$, or 15. Using two's complement to represent negative numbers allows only one representation of zero, and to have effective addition and subtraction while still having the most significant bit as the sign bit.

FIG. 3 is a table showing the relationship between the output voltage and corresponding digital stream presented in two's complement form, and corresponding two's complement value. As shown, the two's complement value is negative when the output voltage exceeds reference voltage Vref, 9V as an example, and positive when the output voltage is lower than reference voltage Vref. Here, the positive two's complement value represents the output voltage to be increased, and the negative one represents the output voltage to be decreased.

The operation of switching module 34 is controlled by voltage control signals, comprising charge signal 351, and load signals 353 and 355. When charge signal 351 is enabled, N-channel transistor 342 in switching module 34 is enabled while P-channel transistors 344 and 346 are disabled. In this configuration, external device 41 is charged by source 43. When load signal 353 is enabled and charge signal 351 is disabled, P-channel transistor 344 of switching module 34 is turned on, while N-channel transistor 342 is turned off. In this configuration, external element 41 is coupled to load 36 and source 43 such that it discharges energy into load 36, increasing first output voltage $V_A$. When load signal 355 is enabled and charge signal 351 is disabled, P-channel transistor 346 of switching module 34 is turned on, while N-channel transistor 342 is turned off. In this configuration, external element 41 is coupled to load 38 and source 43 such that it discharges energy into load 38, increasing second output voltage $V_B$. It is noted that first output voltage $V_A$ and second output voltage $V_B$ can be controlled by adjusting the clock rate of charge signal 351.

Voltage adjustment device 32 provides charge signal 351 and load signals 353 and 355 according to first data $D_A$, second data $D_B$, and a predetermined weighting. Voltage adjustment device 32 comprises weighting selection device 321, decision device 323 and clock generator 325. Weighting selection device 321 applies a predetermined weighting to first data $D_A$ and second data $D_B$ according to characteristics of the first load and the second load. The predetermined weighting is determined according to power consumption characteristics of different loads or power providing priority. For example, to ensure first output voltage $V_A$ reaches the target voltage more quickly, the weighting applied to first data $D_A$ exceeds that applied to second data $D_B$. Decision device 323 generates a first enable signal and a second enable signal by comparing the weighted first data $D_A$ and second data $D_B$. The first enable signal indicates the duration of enabling P-channel transistors 344 and N-channel transistor 342, and the second enable signal indicates that of P-channel transistors 346 and N-channel transistor 342. For example, decision device 323 generates the first enable signal when first data $D_A$ exceeds second data $D_B$, and first data $D_A$ and second data $D_B$ are all positive values.

Clock generator 305 generates charging signal 351 and load signals 353 and 355 according to the first enable signal and the second enable signal. For example, if the voltage corresponding to first data $D_A$ is lower than that of second data $D_B$ when the first data $D_A$ and second data $D_B$ are all positive, the load signal 355 corresponding load 36 will be active during the given set of clock cycles, and if the voltage corresponding to first data $D_A$ exceeds that of second data $D_B$, the load signal 353 corresponding load 38 will be active during the given set of clock cycles.

The voltage regulator according to the invention regulates voltage by applying weighting to the digital data generated by ADCs, increasing flexibility of providing voltage supply to the loads with different characteristics.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A voltage regulator, comprising:
   a first analog to digital converter generating a first digital stream according to the first output voltage and a reference voltage, and generating first data according to the generated first digital stream;
   a second analog to digital converter generating a second digital stream according to the second output voltage and the reference voltage, and generating the second data according to the generated second digital stream;
   a voltage adjustment device applying a predetermined weighting to the first data and the second data according to a power providing priority of a first load and a second load, and generating voltage control signals according to the weighted first data and the weighted second data to make the first output voltage reach a target voltage faster than the second output voltage according to the power providing priority; and
   a switching module respectively providing the first output voltage and the second output voltage to the first load and the second load according to the voltage control signals.

2. The voltage regulator as claimed in claim 1, wherein the voltage adjustment device generates the voltage control signals further according to characteristics of the first load and the second load.

3. The voltage regulator as claimed in claim 1, wherein the first load and the second load have different power consumption characteristics.

4. The voltage regulator as claimed in claim 3, wherein the predetermined weighting is further determined according to the power consumption characteristics of the first load and the second load.

5. The voltage regulator as claimed in claim 1, wherein the voltage adjustment device further comprises a weighting selection device applying the predetermined weighting to the first data and the second data.

6. The voltage regulator as claimed in claim 1, wherein values of the first digital stream and the second digital stream are presented in two's complement form.

7. The voltage regulator as claimed in claim 1, wherein the first data and the second data are two's complement values of the first digital stream and the second digital stream, respectively.

8. The voltage regulator as claimed in claim 1, wherein the voltage adjustment device further comprising a clock generator providing the voltage control signals.

9. The voltage regulator as claimed in claim 1, wherein the voltage control signals comprises a charging signal, a first load signal, and a second load signal.

10. The voltage regulator as claimed in claim 9, wherein the switching module comprises:
    a first switch enabled to charge an external element from a power source in accordance with the charge signal;
    a second switch coupled between the external element and the first load, enabled to provide the first output voltage to the first load by the external element in accordance with the first load signal; and
    a third switch coupled between the external element and the second load, enabled to provide the second output voltage to the second load by the external element in accordance with the second load signal.

11. The voltage regulator as claimed in claim 9, wherein the voltage adjustment device comprises:
    a weighting selection device applying the predetermined weighting to the first data and the second data according to the power providing priority of the first load and the second load;
    a decision device generating an enable signal according to the weighted first data and the weighted second data; and
    a clock generator generating the charging signal, and the first load signal or the second load signal according to the enable signal.

12. A voltage regulating method, comprising:
    generating first data according to a first output voltage and a reference voltage by analog to digital conversion;
    generating second data according to a second output voltage and the reference voltage by analog to digital conversion;
    applying a predetermined weighting to the first data and the second data according to a power providing priority of a first load and a second load;
    generating voltage control signals according to the weighted first data and the weighted second data to make the first output voltage reach a target voltage faster than the second output voltage according to the power providing priority; and
    respectively providing the first output voltage and the second output voltage to a first load and a second load according to the voltage control signals.

13. The voltage regulating method as claimed in claim 12, further comprising generating the voltage control signals according to characteristics of the first load and the second load.

14. The voltage regulating method as claimed in claim 12, wherein the first load and the second load have different power consumption characteristics.

15. The voltage regulating method as claimed in claim 14, wherein the predetermined weighting is determined further according to the power consumption characteristics of the first load and the second load.

16. The voltage regulating method as claimed in claim 12, further comprising:
    generating a first digital stream according to the first output voltage and the reference voltage;
    generating a second digital stream according to the second output voltage and the reference voltage; and
    generating the first data and the second data respectively according to the generated first digital stream and the second digital stream.

17. The voltage regulating method as claimed in claim 16, wherein values of the first digital stream and the second digital stream are presented in two's complement form.

18. The voltage regulating method as claimed in claim 17, wherein the first data and the second data are two's complement values of the first digital stream and the second digital stream, respectively.

19. The voltage regulating method as claimed in claim 12, wherein the voltage control signals comprises a charging signal, a first load signal, and a second load signal.

20. The voltage regulating method as claimed in claim 19, further comprising:
    charging an external element from a power source in accordance with the charge signal;
    providing the first output voltage to the first load by the external element in accordance with the first load signal; and
    providing the second output voltage to the second load by the external element in accordance with the second load signal.

* * * * *